United States Patent
Kajouke et al.

(10) Patent No.: US 7,116,012 B2
(45) Date of Patent: Oct. 3, 2006

(54) STABLE POWER CONVERSION CIRCUITS

(75) Inventors: Lateef A. Kajouke, San Pedro, CA (US); Keming A. Chen, Torrance, CA (US); James F. Lazar, Moorpark, CA (US)

(73) Assignee: General Motors Corporation, Detroit, MI (US)

( * ) Notice: Subject to any disclaimer, the term of this patent is extended or adjusted under 35 U.S.C. 154(b) by 455 days.

(21) Appl. No.: 10/630,496

(22) Filed: Jul. 30, 2003

(65) Prior Publication Data

US 2005/0024904 A1 Feb. 3, 2005

(51) Int. Cl.
*H02J 7/00* (2006.01)

(52) U.S. Cl. .................. 307/64; 323/222; 363/15; 363/60; 363/127

(58) Field of Classification Search .................. 307/64; 323/222; 363/15, 60, 127
See application file for complete search history.

(56) References Cited

U.S. PATENT DOCUMENTS

| | | | |
|---|---|---|---|
| 6,208,529 B1 * | 3/2001 | Davidson | 363/17 |
| 6,222,443 B1 * | 4/2001 | Beeson et al. | 340/431 |
| 6,911,809 B1 * | 6/2005 | Kernahan | 323/283 |
| 2002/0159280 A1 * | 10/2002 | Zhu et al. | 363/98 |
| 2003/0002304 A1 * | 1/2003 | Zhu et al. | 363/56.02 |
| 2003/0012038 A1 * | 1/2003 | Welches et al. | 363/34 |

* cited by examiner

*Primary Examiner*—Brian Sircus
*Assistant Examiner*—Daniel Cavallari
(74) *Attorney, Agent, or Firm*—Christopher DeVries

(57) ABSTRACT

A power conversion circuit includes a current section, a transformer, and a voltage section. The current section includes inductors configured to produce a boosted output voltage from a voltage sourse when then current section is operating in a forward direction. The transformer includes a primary winding electrically coupled to the secondary winding and configured to drive a load. The voltage section includes a pluralaty of balancing switchtes configured to actively driven to provide a DC voltage to the load. The balancing switches balance energy between the current section and the voltage section when the power conversion circuit is the load and operating in the forward direction.

32 Claims, 4 Drawing Sheets

STABLE POWER CONVERSION CIRCUITS

FIELD OF THE INVENTION

The present invention relates to switching power conversion circuits, including, but not limited to, bi-directional power conversion circuits.

BACKGROUND OF THE INVENTION

Bi-directional, isolated DC-to-DC inverters are useful in a wide range of applications. Examples of such applications include, but are not limited to, uninterruptible power supplies, battery charging systems, and auxiliary power supplies for hybrid electrical vehicles.

It has been recognized that two-inductor boost converters suffer from limited output voltage regulation range when operated at low duty cycles. More particularly, when a load is below the minimum input power of a converter circuit of this type, further decreases in the load result in abnormal increases in output voltage due to excess energy storage in the inductors. Yan et al. have proposed a solution to avoid these increases in output voltage. ("Isolated Two-Inductor Boost Converter with One Magnetic Core," Eighteenth Annual Applied Power Electronics Conference and Exposition, Feb. 9–13, 2003, Miami Beach, Fla., pp. 879–885.) An auxiliary transformer is utilized in series with two inductors to magnetically couple the two input current paths, ensuring that the current in the two inductors is the same. Thus, inductor current is eliminated when the load draws no current. A magnetic component disclosed by Yan et al. provides an isolated two-inductor boost converter with one transformer. This component has two inductor windings intrinsically coupled and is implemented with one gap in a three-leg magnetic core. However, circuits utilizing an auxiliary transformer and those utilizing the magnetic component of Yan et al. may require that these windings or components be capable of carrying high currents.

Another example of a DC-to-DC converter is disclosed by Li et al. ("A Natural ZVS High-power Bi-direction dc-to-dc Converter with Minimum Number of Devices," presented at IEEE Industry Applications Society Annual Meeting, Sep. 30–Oct. 4, 2001, Chicago, Ill., pp. 1874–1881.) This converter is operated with dual half-bridges placed on each side of an isolation transformer. When power flows from the low-voltage side to the high-voltage side, the circuit operates in boost mode. Conversely, when power flows in the opposite direction, the circuit works in buck mode to recharge a battery used to provide power to the low-voltage section. To support bidirectionality, a complex thirteen-step commutation procedure is used that depends upon the magnitudes of various currents at specified times.

SUMMARY OF THE INVENTION

Some configurations of the present invention therefore provide a power conversion circuit having balancing switches that are actively driven to balance energy in a no-load condition. For example, in some configurations, a current section of the power conversion circuit has switched inductors. The switched conductors are configured to produce a boosted output voltage from a voltage source when the current section is operated in a forward direction. A transformer of the power conversion circuit has a primary winding electrically coupled to the boosted output voltage and a secondary winding. A voltage section of the power conversion circuit is electrically coupled to the secondary winding and is configured to electrically couple to a load. The voltage section includes a plurality of balancing switches that are configured to be actively driven. The balancing switches are configured so that, when they are actively driven, a DC voltage can be provided to the load. In addition, the driving of the balancing switches balances energy between the current section and the voltage section when the power conversion circuit is in a no-load condition and operated in the forward direction.

In some configurations, the current section includes switched circuit branches. Each branch has at least one switched inductor and a branch switch. The power conversion circuit also includes a control circuit that is configured to drive the branch switches and the plurality of balancing switches. In various configurations, a plurality of subsets of balancing switches are driven in a complementary fashion to a corresponding subset of the branch switches.

The current section, the voltage section, or both sections can be (but need not be) isolated from a common ground. For example, in some configurations, the current section is electrically connect to a common ground, and the voltage section is electrically isolated from the common ground.

Some configurations of the present invention employ a rechargeable battery as a voltage source. (As used herein, a "battery" may include one or more cells.) The load can be a fuel cell coupled to the voltage section and configured to receive a initial operating voltage from the voltage section. For example, a boosted voltage from the battery can be used in some configurations to drive a compressor that starts the operation of the fuel cell. Also, in some configurations, when the fuel cell is operating, the current section is configured to operate as a rectifier in a reverse direction and the voltage section is configured to operate as a buck converter. Such configurations can be used to utilize an operating fuel cell to recharge the rechargeable battery, which can be useful in various types of vehicles and other devices.

Various configurations of the present invention will be seen to reduce the need for additional inductive components to stabilize the power conversion circuit when operated in a no-load condition, and provide substantial voltage boosts in an efficient manner.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
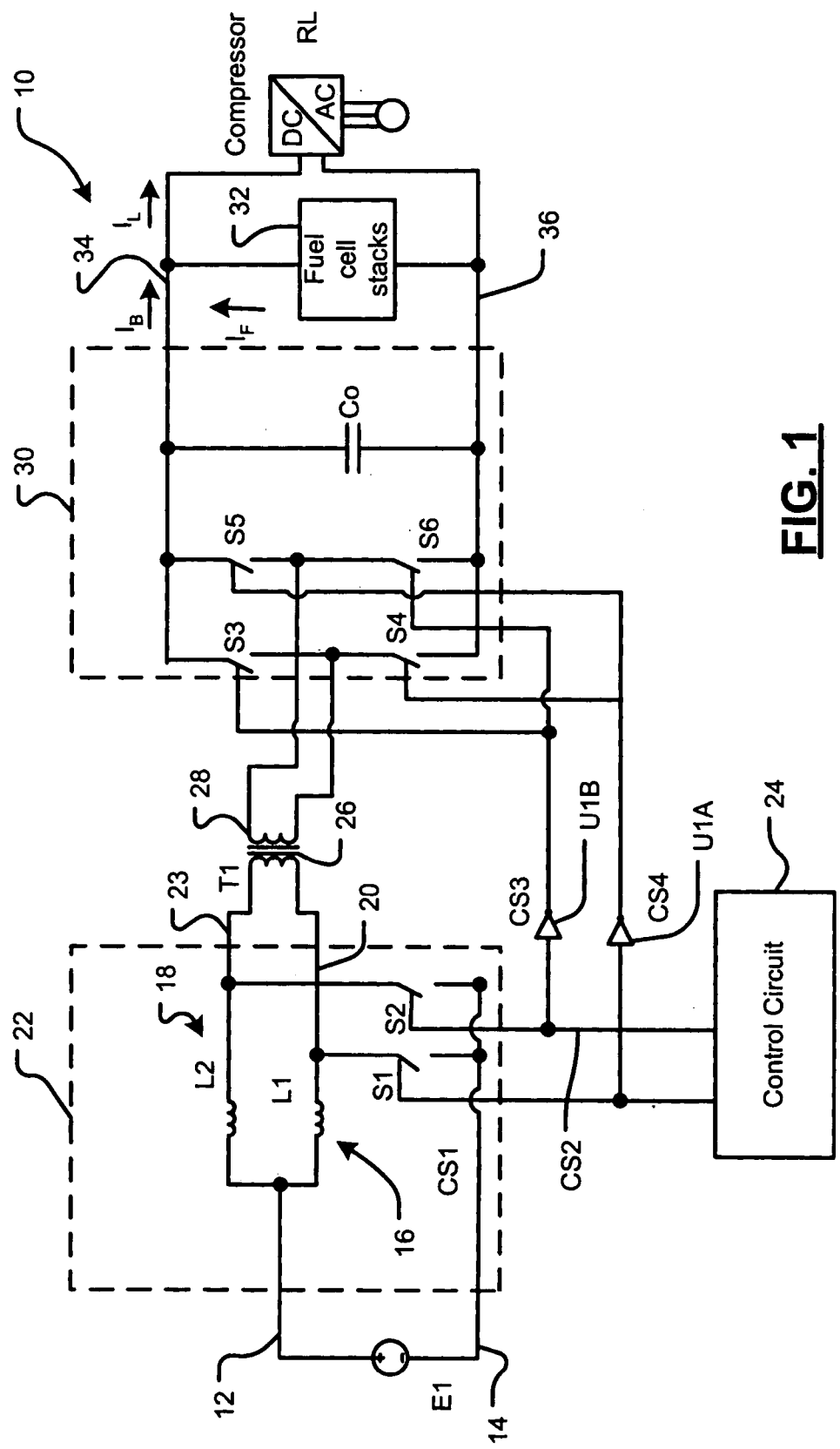
FIG. 1 is a schematic diagram representative of various configurations of no load controllers of the present invention.

In some configurations of the present invention and referring to FIG. 1, a power conversion circuit 10 comprises a current section 22. Current section 22 is configured to receive an input voltage from a voltage source E1 between a first node 12 and a node 14 that can be a common ground. For example, voltage source E1 may be an automobile battery supplying 9 to 15 volts DC. Common ground 14 may be a vehicle chassis or a conductive portion thereof. The vehicle chassis may be an automobile chassis, and voltage source E1 may be a rechargeable storage battery. However, the present invention is not limited to use in automobiles or other vehicles.

Current section 22 in some configurations comprises a pair of switched circuit branches 16, 18 each of which comprises an inductor L1, L2, respectively. (The proximity of inductors L1 and L2 in FIG. 1 is not intended to indicate that inductors L1 and L2 have any appreciable mutual magnetic coupling.) Current section 22 is configured to boost a voltage from voltage source E1 when operated current section 22 is operated in a forward direction. For example, as is known in the art, circuit branch 16 can operate to produce a voltage $$V_o = V_{in} \cdot \frac{T}{T - t_{on}}$$

between node 20 and ground 14. In this expression, $V_{in}$ is the voltage provided by voltage source E1. T is the switching period (i.e., the time taken for one on/off cycle) of branch 16 switch S1. $t_{on}$ is the "on" (i.e., closed) time of branch 16 switch S1 during a cycle. To provide this boost, a rectifier would be placed between inductor L1 and node 20. The resulting DC voltage would be filtered and a load sufficient to ensure stability would be placed across the filtered DC voltage. Circuit branch 18, inductor L2, switch S2, and node 23 could provide a boost in the same manner. However, in some configurations of the present invention, an isolation transformer T1 and a set of balancing switches are used in conjunction with circuit branches 16 and 18. For example, transformer T1 is coupled between nodes 20 and 23 on the one side and filtering capacitor CO and load RL on the other.

Circuit branches 16 and 18 can be switched utilizing a control circuit 24 configured to operate switches S1 and S2, respectively. For example, control circuit 24 provides two control signals CS1 and CS2. Control signal CS1 operates to open and close branch 16 switch S1 and control signal CS2 operates to open and close branch 18 switch S2. In this manner, an alternating, boosted voltage is applied to a primary winding 26 of an isolation transformer T1. This boosted voltage is not isolated from common ground 14. More particularly, whenever either or both of branch switches S1 and/or S2 are closed, primary winding 26 of transformer T1 is electrically coupled to ground 14.

Figure 2:
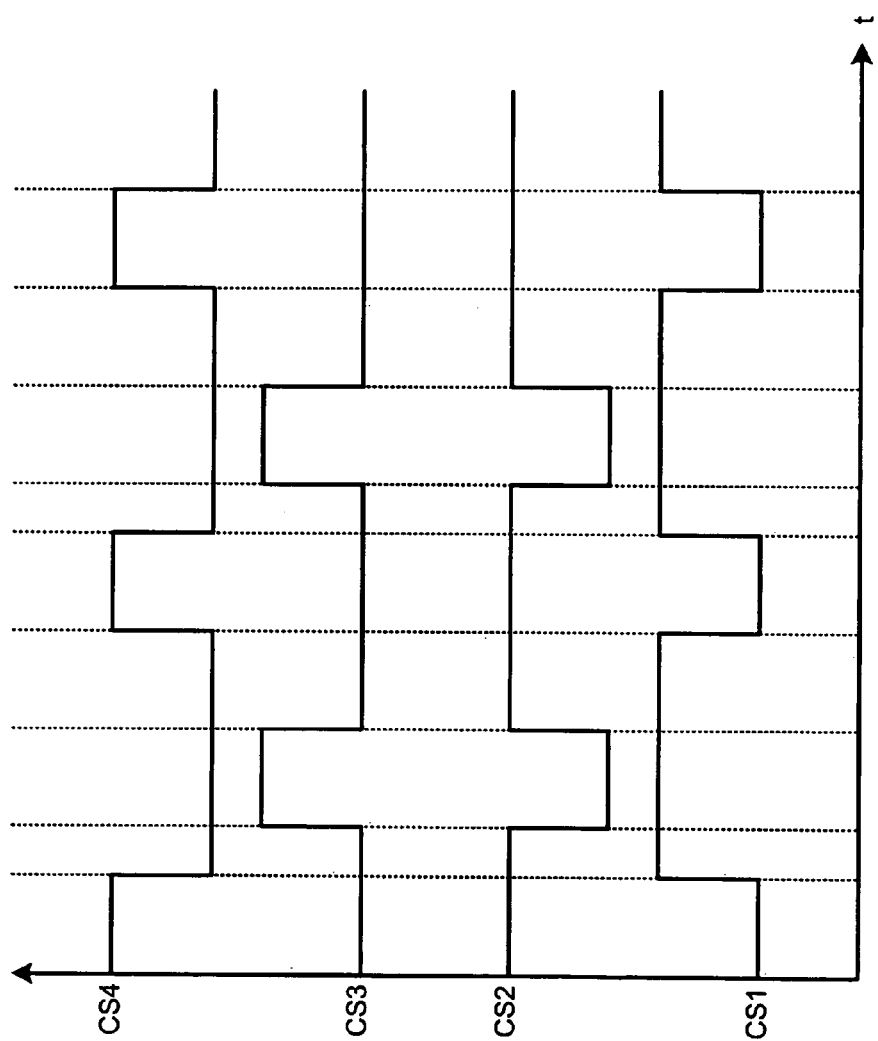
FIG. 2 is a timing diagram of certain electrical signals in the schematic diagram of FIG. 1.

In many configurations of the present invention, control circuit 24 includes logic (not shown) that provides a minimum duty cycle for each switch S1 and S2 of 50 percent. Control circuit 24 also prevents branch switches S1 and S2 from both being in the "open" state at the same time. A timing diagram showing an example of the timing of control signals CS1 and CS2 is shown in FIG. 2. FIG. 2 is intended to be sufficiently illustrative to serve for explanatory purposes, but should not be interpreted as showing timing range limits or restrictions of any particular configuration. During times when both switch S1 and S2 are closed, there is no voltage across primary winding 26 of transformer T1.

Referring again to FIG. 1, isolation transformer T1 also has a secondary winding 28 that is coupled to a voltage section 30 that is electrically isolated from common ground 14. By "isolated from common ground," it is meant that voltage section 30 is configured to couple a voltage isolated from common ground to a load RL. Control signals CS3 and CS4 may also be isolated from common ground 14, but need not be for voltage section 30 to be considered "isolated from common ground." In various configurations, voltage section 30 comprises a plurality of balancing switches S3, S4, S5, and S6. Voltage section 30 rectifies a voltage from transformer T1, produces a DC voltage therefrom, and is configured to electrically couple this DC voltage to a load RL.

In various configurations of the present invention, a first group of balancing switches are operated simultaneously with branch 18 switch S2. For example, balancing switches S3 and S6 are opened and closed simultaneously with the closing and opening, respectively, of branch 18 switch S2. Also, a second group of balancing switches are operated simultaneously with branch 16 switch S1. For example, balancing switches S4 and S5 are opened and closed simultaneously with the closing and opening, respectively, of branch 16 switch S1. Thus, there are a plurality of sets of switches for which a subset of balancing switches on current section 22 is actively driven (i.e., by a control current or voltage, such as CS3 or CS4, applied to a control input of the switch, for example, a gate of an FET). The subsets of balancing switches are driven in a complementary fashion (oppositely and either simultaneously or nearly simultaneously) to a subset of branch switches on voltage section 30. One such set comprises branch 16 switch S1 in current section 22 and switches S4 and S5 in voltage section 30. The other set comprises branch 18 switch S2 in current section 22 and switches S3 and S6 in voltage section 30. The complementary operation of the sets of switches results in the same polarity of voltage being applied to load RL and smoothing capacitor CO, whether branch switch S1 is closed and branch switch S2 is open or branch switch S2 is closed and branch switch S1 is open. Thus, balancing switches S3, S4, S5, and S6 operate as a switched full-wave bridge rectifier, relative to the alternating voltage at the secondary of T1, when voltage section 30 is operated in a forward direction. (As used herein, power conversion circuit 10 is operated in a forward direction when both current section 22 and voltage section 30 are operated in their forward directions.)

In various configurations of the present invention, a control circuit 24 is utilized to generate switching signals CS1 and CS2. Also, inverters U1A and U1B are used to derive switching signals CS4 and CS3 from CS1 and CS2, respectively, as shown in FIG. 1 and FIG. 2.

Some configurations of the present invention are useful in vehicular systems in which voltage source E1 is a rechargeable battery and load RL is a compressor motor for a fuel cell 32. Compressor RL requires an initial operating voltage to be supplied by voltage section 30. In some configurations, compressor RL may require an initial operating voltage of approximately 300 volts to start, but the only power available at startup is power derived from voltage source E1. Voltage source E1 itself may be a 9 to 15 volt rechargeable battery grounded to a common ground 14. Although voltage source E1 may be grounded to a vehicle chassis 14 (or a portion thereof), the relatively high voltage required to start the compressor may be isolated from the chassis ground for safety and/or other reasons. A high voltage may be required by compressor RL in some configurations. Because the high voltage may be required at high current, it can be difficult to efficiently provide the needed voltage boost solely by utilizing a step-up transformer T1. Therefore, in some configurations, efficiency is increased by providing a portion of the needed voltage boost by transformer T1 and the remainder by operating current section 22 as a boost converter. For example, E1 may provide a nominal 12 volts, transformer T1 may provide a step-up factor of 6 in voltage, and current section 22 may provide a boost of 4.2. The boost of current section 22 may be realized utilizing duty cycles of about 76% for branch switches S1 and S2 (i.e., switch S1 is closed 76% of the time, and switch S2 is also closed 76% of the time.) The values that apply to this example may be varied as needed to meet the requirements of other configurations, taking into account circuit and component tolerances.

Figure 3:
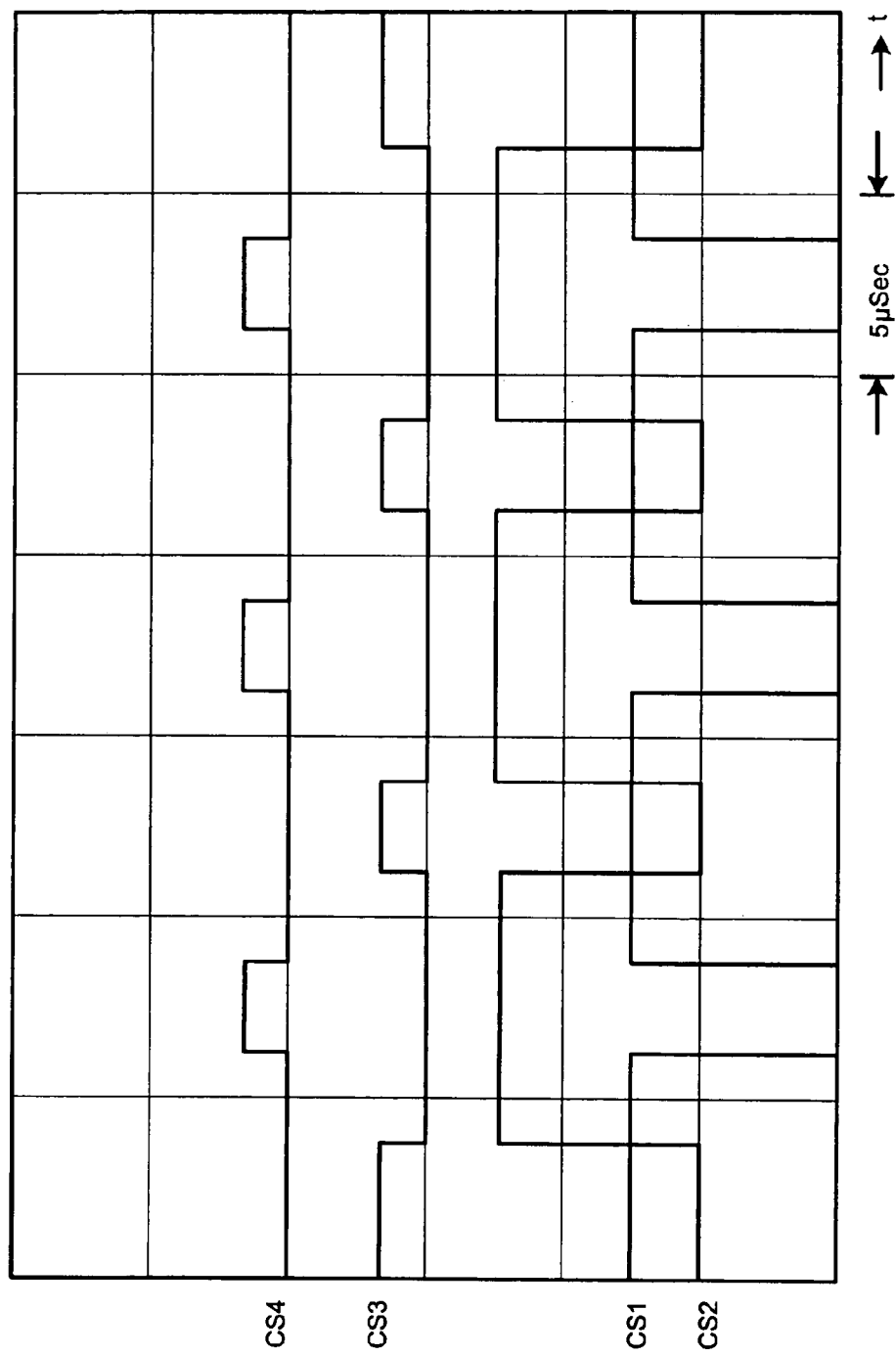
FIG. 3 is a timing diagram of the electrical signals shown in FIG. 2 showing particular timing intervals useful in some configurations.
Figure 4:
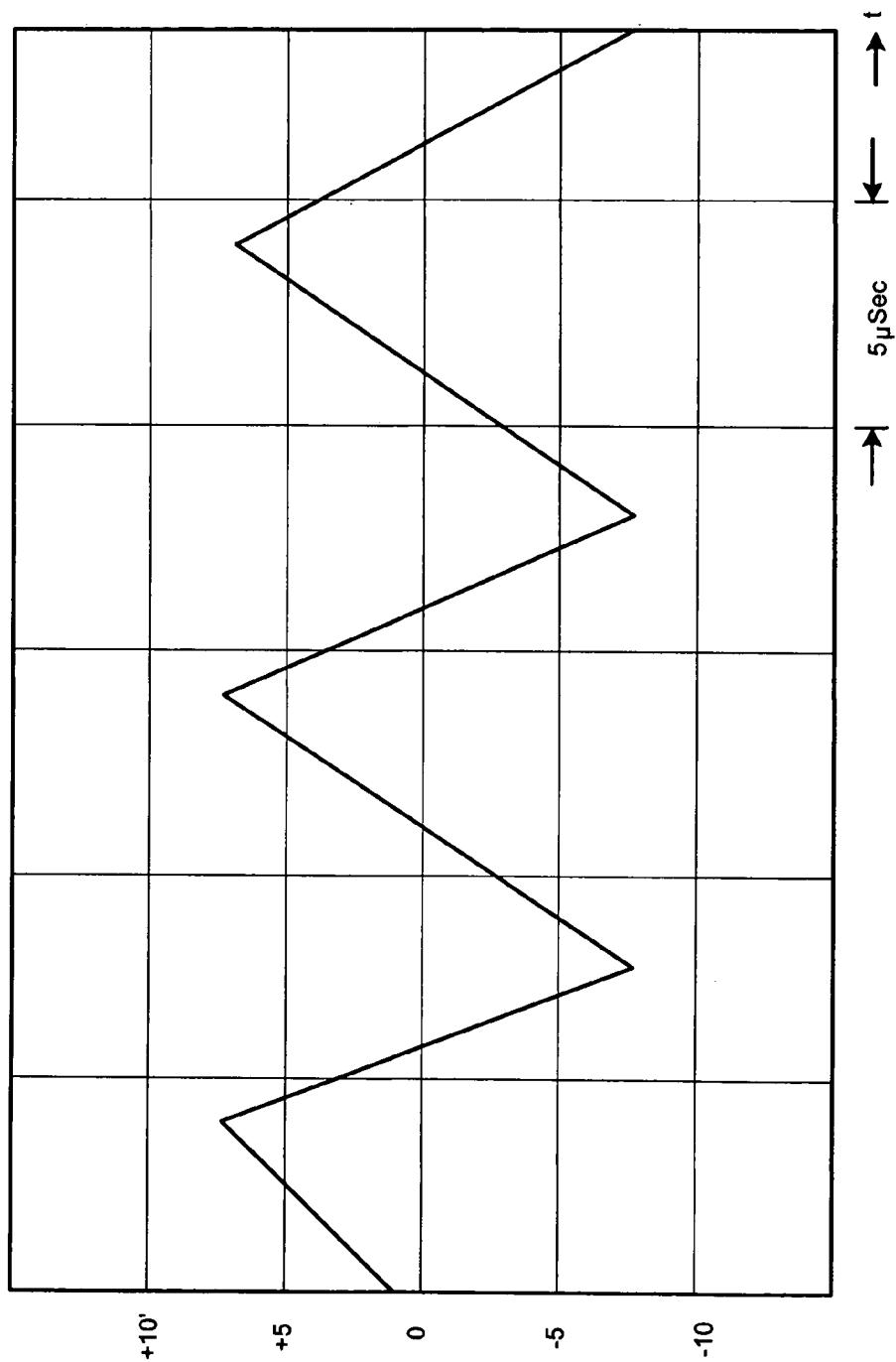
FIG. 4 is a timing diagram of inductor current in a switching branch of FIG. 1, corresponding to the electrical signal timing intervals shown in FIG. 3.

A current IB is drawn from voltage section 30 in some configurations of the present invention. Initially, IB=IL, where IL is the current drawn by compressor RL (and any other loads, not shown, coupled across the high-voltage output 34, 36 of voltage section 30). When fuel cell 32 is operating, it supplies a current IF. When current IF is sufficient to supply the entire current IL, a "no-load" condition of power conversion circuit 10 occurs, i.e., IB=0 and the load draws no steady-state energy from voltage source E1. At or near the no-load condition, the switching action resulting from control signals CS1, CS2, CS3, and CS4 stabilizes inductor current through L1 and L2 and thereby avoids instability in current section 22. For example, in some configurations, the switching waveforms shown in FIG. 3 result in a steady-state, no-load inductor current (through L1, for example) as shown in FIG. 4. Moreover, the operation of balancing switches S3, S4, S5, and S6 in the timing relationship described herein with switches S1 and S2 serves to balance energy between current section 22 and voltage section 30. Thus, energy is transferred back and forth in a steady-state, stable fashion, i.e., voltages remain controlled and stable in a manner similar to the case in which a nominal load RL were drawing current. Without such balancing, the voltage would tend to increase, typically resulting in protection circuitry (not shown in the Figures) tripping and shutting down the circuit 10.

Current section 22 is bi-directional in some configurations. More particularly, when fuel cell 32 is operating, a sufficient current IF is available to allow a current to flow in the negative IB direction, which is converted to an alternating current by voltage section 30. In this configuration, voltage section 30 operates in reverse as a buck converter. The alternating current is coupled from secondary winding 28 of transformer T1 to primary winding 26. (If T1 is configured as a step-up transformer in the forward direction, it will operate as a step-down transformer in the reverse direction.) Current section 22 then operates in reverse as a rectifier to produce a DC voltage at a suitable level for charging source E1. For example, the voltage in some configurations is reduced to between 12–15 volts to charge a lead acid storage battery E1. Isolation of the high voltage return is provided by T1. Thus, in a configuration in which power conversion circuit 10 is utilized in an automobile to start a fuel cell compressor RL, the return voltage (300 volts) of fuel cell 32 is isolated from the automobile chassis.

In some configurations, branch switches S1 and S2 can comprise IXFN230N10 semiconductor switches available from IXYS Semiconductors. Switches S3, S4, S5, and S6 can comprise HGTH30N60B3D semiconductor switches available from Fairchild. Other suitable switches may be substituted as a design choice. For example, other semiconductor switches or other types of switches may be used in some configurations as a design choice.

In some configurations of the present invention, one or more voltage and/or current sensors (not shown) can be provided in current section 22 and/or voltage section 30 to provide feedback to controller 24. This feedback may be utilized to adjust the duty cycles of control signals CS1 and CS2 as necessary to increase stability and/or improve voltage regulation. For example, voltage and/or current sensors may be placed at any combination of node 12, branch 16, branch 18, node 34 and/or node 36.

Configurations of the present invention do not require that node 14 be electrically connected to a common ground, nor that voltage section 30 be isolated from a common ground. Either or both of current section 22 or voltage section 30 may be electrically connected to a common ground, with those sides (if any) not electrically connected to the common ground left "floating."

Stray coupling, parasitic effects, circuit imbalances, and/or deviations of components from their ideal models may cause voltages or currents described herein to deviate slightly from their ideal values in many embodiments. Slight imperfections from nominal values can be tolerated without loss of utility and without fundamentally changing the operation of configurations of the invention. This same spirit is to be applied in construing certain terms used herein, such as "simultaneously" and "drawing no current."

It will thus be appreciated that various configurations of the present invention reduce the need for additional inductive components to stabilize the power conversion circuit when operated in a no-load condition. In addition, various configurations of the present invention provide substantial voltage boosts in an efficient manner.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A power conversion circuit comprising:
   a current section comprising inductors and configured to produce a boosted output voltage from a voltage source when the current section is operated in a forward direction;
   a transformer having a primary winding electrically coupled to said boosted output voltage and a secondary winding; and
   a voltage section electrically coupled to the secondary winding and configured to drive a load, said voltage section comprising a plurality of balancing switches configured to be actively driven to provide a DC voltage to the load and to balance energy between said current section and said voltage section when said power conversion circuit is not driving the load and operated in the forward direction.

2. A power conversion circuit in accordance with claim 1 wherein said current section comprises switched circuit branches, each said branch having at least one said inductor and a branch switch, and further comprising a control circuit configured to drive said branch switches and said plurality of balancing switches.

3. A power conversion circuit in accordance with claim 2 wherein a first subset of said plurality of balancing switches is driven in a complementary fashion to a first subset of said branch switches.

4. A power conversion circuit in accordance with claim 2 wherein each of a plurality of subsets of said plurality of balancing switches is driven in a complementary fashion to a corresponding one of a plurality of subsets of said branch switches.

5. A power conversion circuit in accordance with claim 1 further comprising a common ground, and wherein said current section is electrically connected to said common ground and said voltage section is electrically isolated from said common ground.

6. A power conversion circuit in accordance with claim 1 further comprising the voltage source, and wherein said voltage source is a rechargeable battery.

7. A power conversion circuit in accordance with claim 6 further comprising the load, and wherein said load comprises a fuel cell electrically coupled to the voltage section and configured to receive an initial operating voltage therefrom.

8. A power conversion circuit in accordance with claim 7 wherein said current section is configured to operate as a rectifier in a reverse direction when said fuel cell is operating, and said voltage section is configured to operate as a buck converter in a reverse direction when said fuel cell is operating, to recharge said rechargeable battery.

9. A power conversion circuit in accordance with claim 8 further comprising a common ground, and wherein said current section is electrically connected to said common ground and said voltage section is electrically isolated from said common ground.

10. A power conversion circuit in accordance with claim 9 wherein the common ground is a vehicle chassis.

11. A power conversion circuit in accordance with claim 8 wherein said current section comprises switched circuit branches, each said branch having at least one said inductor and a branch switch, and further comprising a control circuit configured to drive said branch switches and said plurality of balancing switches.

12. A power conversion circuit in accordance with claim 11 wherein a first subset of said plurality of balancing switches is driven in a complementary fashion to a first subset of said branch switches.

13. A power conversion circuit in accordance with claim 11 wherein each of a plurality of subsets of said plurality of balancing switches is driven in a complementary fashion to a corresponding one of a plurality of subsets of said branch switches.

14. A power conversion circuit comprising:
a current section configured to receive a input voltage from a voltage source at a first node and common ground, said current section having a pair of switched circuit branches each comprising an inductor and a branch switch and configured to boost a voltage from the current source when the current section is operated in a forward direction;
a transformer having a primary winding and a secondary winding, said primary winding configured to receive said boosted voltage from said current section when said current section is operated in the forward direction, and wherein said secondary winding is electrically isolated from said common ground; and
a voltage section coupled to said transformer, isolated from said common ground, and configured to drive a load, said voltage section including a plurality of actively-driven balancing switches configured to balance energy between said current section and said voltage section when said voltage section is operated in the forward direction and said power conversion circuit is not driving said load.

15. A power conversion circuit in accordance with claim 14 further comprising a control circuit configured to switch said switched circuit branches and to actively drive said plurality of balancing switches.

16. A power conversion circuit in accordance with claim 15 wherein a first subset of said plurality of balancing switches is driven in a complementary fashion to a first subset of said branch switches.

17. A power conversion circuit in accordance with claim 15 wherein each of a plurality of subsets of said plurality of balancing switches is driven in a complementary fashion to a corresponding one of a plurality of subsets of said branch switches.

18. A power conversion circuit in accordance with claim 17 wherein said current section is configured to operate as a rectifier when operated in a reverse direction and said voltage section is configured to operate in a buck mode when operated in the reverse direction.

19. A power conversion circuit in accordance with claim 18 wherein the voltage source is rechargeable and the power conversion circuit includes said rechargeable voltage source.

20. A power conversion circuit in accordance with claim 19 wherein the load comprises a fuel cell, and the power conversion circuit includes said fuel cell.

21. A power conversion circuit in accordance with claim 20 wherein said voltage section is configured to apply an initial voltage to the fuel cell when operated in the forward direction, and to recharge the voltage source from the fuel cell when operated in the reverse direction.

22. A method for operating a power converter circuit having a current section, a transformer, and a voltage section, the current section having a plurality of switched inductors and branch switches and the voltage section having a plurality of balancing switches; said method comprising:
utilizing the branch switches to switch the switched inductors to generate a boosted voltage from a voltage source;
applying the boosted voltage to a primary winding of the transformer to produce a transformed voltage;
coupling a transformed voltage from a secondary winding of the transformer to a balancing section configured to provide power to a load; and
actively driving the balancing switches in the voltage section to rectify the transformed voltage applied to the load, and to balance energy between the current section and the voltage section when the power converter circuit is not providing power to the load and is operating in a forward direction.

23. A method in accordance with claim 22 further comprising operating a control section to actively drive the balancing switches and to switch said branch switches.

24. A method in accordance with claim 23 wherein said operating the control section comprises driving a first subset of the balancing switches in a complementary fashion to a first subset of the branch switches.

25. A method in accordance with claim 23 wherein said operating the control section comprises driving each of a plurality of subsets of the balancing switches in a complementary fashion to a corresponding one of a plurality of subsets of the branch switches.

26. A method in accordance with claim 22 further comprising operating the current section and the voltage section in a reverse direction, and operating the voltage section in a buck mode and the current section as a rectifier when operated in the reverse direction.

27. A method in accordance with claim 26 further comprising recharging the voltage source when operating the current section and the voltage section in the reverse direction.

28. A method in accordance with claim 27 further comprising utilizing the rectified, transformed voltage to apply a starting voltage to a fuel cell.

29. A method in accordance with claim 28 performed in a vehicle.

30. A method in accordance with claim 28 further comprising operating a control section to actively drive the balancing switches and to switch said branch switches.

31. A method in accordance with claim 30 wherein said operating the control section comprises driving a first subset of the balancing switches in a complementary fashion to a first subset of the branch switches.

32. A method in accordance with claim 30 wherein said operating the control section comprises driving each of a plurality of subsets of the balancing switches in a complementary fashion to a corresponding one of a plurality of subsets of the branch switches.

* * * * *